United States Patent [19]
Uchida et al.

[11] Patent Number: 5,664,870
[45] Date of Patent: Sep. 9, 1997

[54] VEHICULAR LAMPS

[75] Inventors: Kihachiro Uchida; Hironori Tsukamoto; Kazuto Nitta, all of Shizuoka, Japan

[73] Assignee: Koito Manufacturing Co., Ltd., Tokyo, Japan

[21] Appl. No.: 665,873

[22] Filed: Jun. 19, 1996

[30] Foreign Application Priority Data

Jun. 28, 1995 [JP] Japan ................................. 7-183247
Sep. 4, 1995 [JP] Japan ................................. 7-248345

[51] Int. Cl.[6] ..................................................... F21M 5/00
[52] U.S. Cl. ........................... 362/61; 362/226; 439/699.2
[58] Field of Search ............................... 362/61, 80, 226; 439/414, 699.1, 699.2, 617, 541, 543

[56] References Cited

U.S. PATENT DOCUMENTS

| | | | |
|---|---|---|---|
| 4,569,006 | 2/1986 | Bergin et al. | 362/61 |
| 4,609,977 | 9/1986 | Eckhardt et al. | 362/61 |
| 4,772,989 | 9/1988 | Haraden | 362/61 |
| 4,868,722 | 9/1989 | Haraden | 362/80 |
| 4,940,422 | 7/1990 | Forish et al. | 439/699.2 |
| 5,239,226 | 8/1993 | Seredich et al. | 362/226 |
| 5,538,443 | 7/1996 | Inoue et al. | 439/699.2 |
| 5,547,402 | 8/1996 | Ogawa | 439/699.2 |

*Primary Examiner*—Stephen F. Husar
*Assistant Examiner*—Sara Sachie Raab
*Attorney, Agent, or Firm*—Sughrue, Mion, Zinn, Macpeak & Seas

[57] ABSTRACT

A vehicular lamp having a structure of electrical connection between a lamp bulb serving as a light source installed in a lamp body and an external power source for supplying electric power to the lamp bulb which includes a back cover detachably attached to a bulb insertion hole formed in a back surface of the lamp body and a relay connector connecting with both the lamp bulb and an external power source, and the relay connector is constituted by an internal electrical connection section disposed at an inside of the back cover for electrically connecting with the lamp bulb and an external electrical connection section disposed at an outside of the back cover for connecting with a harness for the external power source. The internal electrical connection section and the external electrical connection section are formed integrally with each other by a conductive terminal which penetrates the back cover.

28 Claims, 12 Drawing Sheets

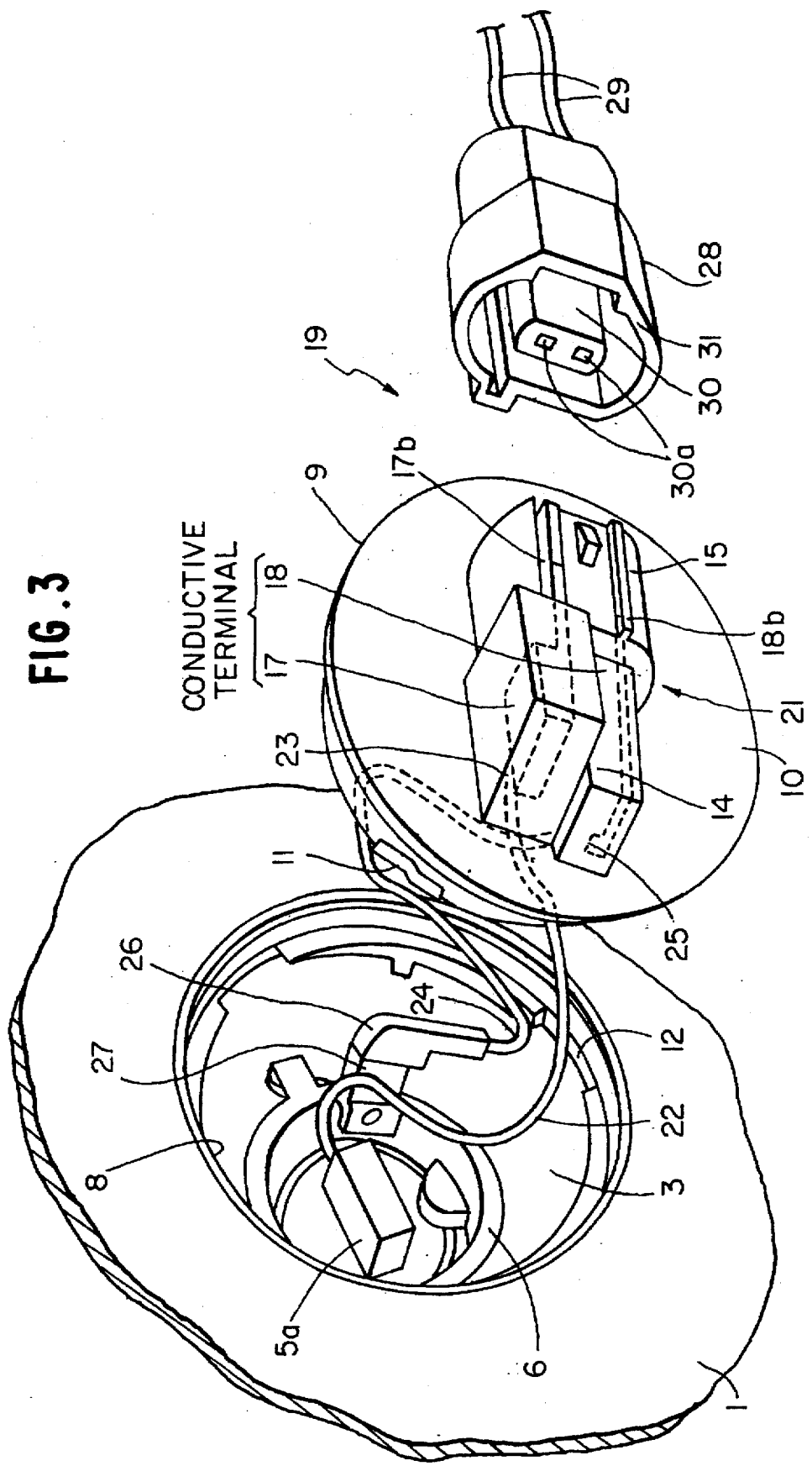

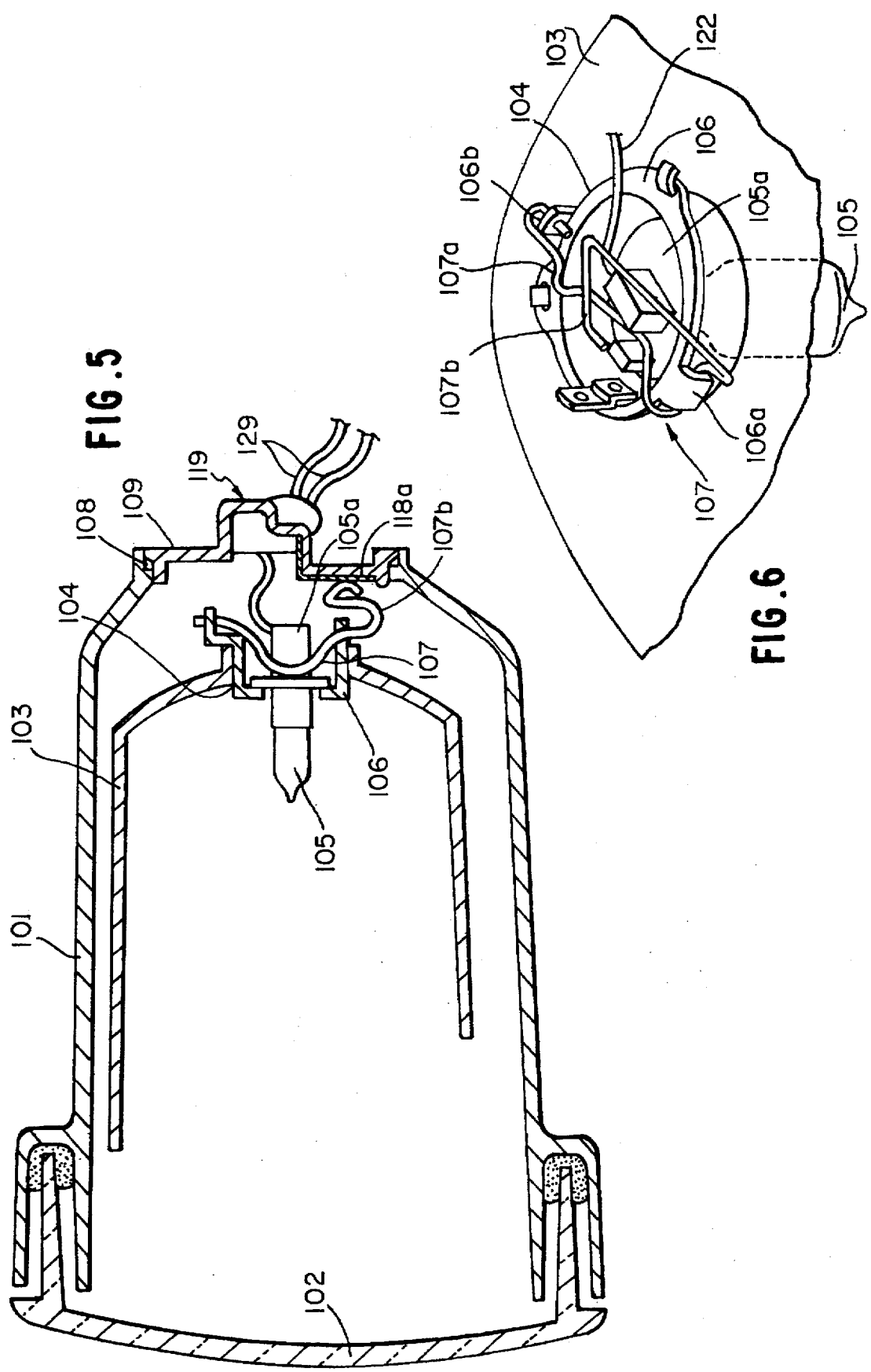

VEHICULAR LAMPS

BACKGROUND OF THE INVENTION

1. Field of the Invention

The present invention relates generally to a vehicular lamp, and more particularly to a vehicular lamp which is improved in a structure of electrical connection between a lamp bulb serving as a light source installed in a lamp body and an external power source for supplying electric power to the lamp bulb.

2. Related Art

According to a conventional structure for electrically connecting with a lamp bulb installed in a lamp body of a vehicular lamp, a power source code is connected through connection codes with both a bulb code on a positive side connecting to a metal piece of the lamp bulb and an earth code on a negative side (earth side). Particularly in a case where the lamp bulb is installed within the lamp body in such a manner that an aiming adjustment can be performed, since a reflector and the lamp bulb are operated to pivotally move relative to the lamp body, the bulb code and the earth code are connected with a relay connector which electrically connects with the outside of the lamp body in order to prevent these codes from obstructing the pivotally movement.

FIG. 14 is a perspective view, showing one example of the conventional electrical connection structure. As shown in FIG. 1–4, a bulb insertion hole 8 is formed in a back surface of a lamp body 1 and a lamp bulb 5 is detachably mounted through the bulb insertion hole 8 on a reflector 3 which is installed within the lamp body 1. A back cover 9A for covering the bulb insertion hole 8 is fitted in the bulb insertion hole 8 to seal the inside of the lamp body. The back cover 9A is provided with a relay connector 40 and a pair of electrode pieces 41 supported at the inner side thereof. An electrode terminal disposed at a tip end of a bulb code 22 of a positive side connecting with the lamp bulb 5 engages with the electrode piece 41 of the relay connector 40 so that the electrical connection is achieved.

An intermediate code 42 drawn out of the back cover 9A has one end part connecting with the other end of the electrode piece 41 of the relay connector 40 and the other end part connecting with an intermediate connector 43. The intermediate connector 43 engages with a vehicle side connector 44 connecting with a power supply code 29. When the intermediate connector 43 engages with to the vehicle side connector 44, electric power is supplied from a battery mounted on a vehicle body to the lamp bulb 5 through the power supply code 29, vehicle side connector 44, intermediate connector 43, intermediate code 42 and relay connector 40. An earth code 30 having one end part connecting directly with the intermediate connector 43 is provided with an earth electrode terminal 31 disposed at the other end part thereof engaging electrically with an earth terminal disposed on the reflector.

By using the relay connector 40, even in a case where external force is applied between the power supply code 29 and the intermediate code 42, the external force is absorbed by the relay connector 40 and not applied up to the bulb code 22, so that the bulb code 22 would not be broken or the lamp bulb 5 would not be damaged due to unnatural force applied thereto. Further, by disposing the intermediate connector 43 and the vehicle side connector 44, the workability for attaching /detaching operation of the lamp to and from the vehicle body can be improved.

However, the conventional structure as described above is suffered from a problem that it requires the relay connector 40 disposed on the back cover 9A, the intermediate connector 43 and the vehicle side connector 44 for connecting the relay connector 40 with the power supply source, which raises the number of parts.

Further, when the lamp bulb 5 is attached or detached during maintenance or the lamp bulb 5 is exchanged, the conventional structure requires an operation for engaging the intermediate connector 43 with the vehicle side connector 44, an operation for connecting the intermediate code 42 with the relay connector 40, in addition, an operation for connecting the bulb code 22 with the relay connector 40 and an operation for attaching or detaching the earth electrode terminal 31 of the earth code 30 to or from the earth terminal. Therefore, many operation steps are required so that the workability during assembly is complicated and ineffective.

Furthermore, as described above, if an external force such as purring force is applied to the intermediate code 42 through the power supply code 29 drawn out of the lamp, the external force is prevented from applying to the lamp bulb 5 owing to the intermediate connector 40. However, the external force may cause a damage to the relay connector 40 because a wire break may occur at a connection point between the intermediate code 42 and the relay connector 40, for example, a connection point between the electrode pieces 41 and the intermediate code 42. If such a wire breaks occurs, the repair would be intricate because it is within the back cover 9A.

SUMMARY OF THE INVENTION

The present invention was made in view of the foregoing problems or drawbacks accompanying the conventional structure. Therefore, an object of the present invention is to provide a vehicular lamp having a structure of electrical connection between a lamp bulb serving as a light source installed in a lamp body and an external power source for supplying electric power to the lamp bulb, capable of reducing required number of parts and assembly steps so that operation for repair can be made easily.

Another object of the invention is to provide a vehicular lamp having a structure of electrical connection between a lamp bulb serving as a light source installed in a lamp body and an external power source for supplying electric power to the lamp bulb, capable of reducing required assembly steps for attaching or detaching the lamp bulb.

The above and other objects can be achieved by a provision of a vehicular lamp having a structure of electrical connection between a lamp bulb serving as a light source installed in a lamp body and an external power source for supplying electric power to the lamp bulb which, according to the present invention, includes a back cover detachably attached to a bulb insertion hole formed in a back surface of the lamp body and a relay connector connecting with both the lamp bulb and an external power source. The relay connector is constituted by an internal electrical connection section disposed at an inside of the back cover for electrically connecting with the lamp bulb and an external electrical connection section disposed at an outside of the back cover for connecting with a harness for the external power source. The internal electrical connection section and the external electrical connection section are formed integrally with each other by a conductive terminal which penetrates the back cover.

It is more preferable that the lamp bulb is supported on a reflector installed within the lamp and the reflector is designed to be aiming-adjustable with respect to the lamp body, and the lamp bulb is electrically connected with the internal connector by a flexible code.

According to the invention, since both the bulb code and the earth code are connected with the internal electrical connection section of the relay connector and the external power source harness is connected with the external electrical connection section to thereby accomplish the electrical connection between the external power source and the lamp bulb, no intermediate connector is required which reduces the number of parts and the workability during the assembling operation can be simplified. Further, if an external force is applied, merely the connector connecting to the external electrical connection section would be detached and no damage would be applied to the relay connector.

According to another aspect of the present invention, a reflector installed within the lamp body for supporting a lamp bulb is provided with a conductive resilient member protruding therefrom connecting with an electrode of the lamp bulb, and when a back cover is attached to cover an opening of the lamp body the electrode terminal connecting with an external power source comes into resilient contact to the conductive resilient member to thereby accomplish the electrical connection.

With the structure according to another aspect of the present invention, a conductive set spring is disposed on the reflector for securing the lamp bulb to the reflector, one end part of the set spring is electrically connected with the electrode of the lamp bulb and the other end of which is formed to be a spring serving as the resilient member. Further, a conductive mounting metal piece is disposed on the reflector for mounting the lamp bulb on the reflector, and the mounting metal piece is electrically connected with the electrode of the lamp bulb. A part of the mounting metal piece is designed to perform as a resilient member having a spring force. Alternatively, the back cover is provided with a conductive resilient member protruding therefrom electrically connecting with the electrode terminal, and the resilient member comes into resiliently contact to the electrode of the lamp bulb or a part electrically connecting thereof to thereby accomplish the electrical connection.

BRIEF DESCRIPTION OF THE DRAWINGS

FIG. 3 is a perspective view showing an essential part of the back cover shown in FIG. 1;

FIG. 5 is a sectional view showing a fog lamp of an automobile to which a second embodiment of the present invention is applied;

FIG. 6 is a perspective view showing a bulb mounting structure according to the second embodiment of the present invention;

DESCRIPTION OF THE PREFERRED EMBODIMENTS

Preferred embodiments of the present invention will now be described with reference to accompanying drawings.

Figure 1:
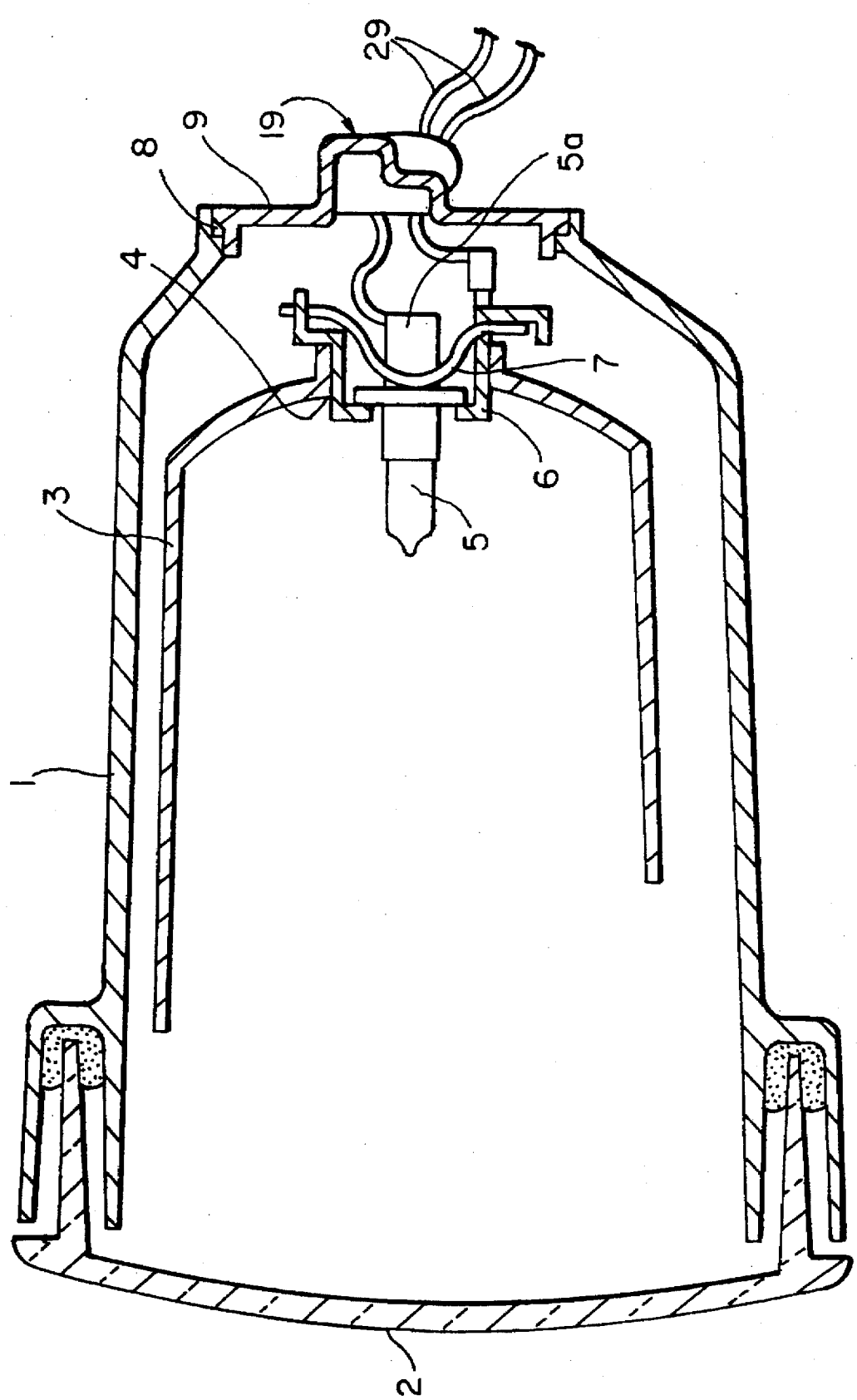
FIG. 1 is a sectional view showing a fog lamp of an automobile to which a first embodiment of the present invention is applied.

FIG. 1 is a sectional view showing a fog lamp of an automobile to which a first embodiment of the present invention is applied. As shown in FIG. 1, a lamp body 1 formed of resin and an outer lens 2 coupled to a front opening of the lamp body 1 define a lamp chamber. A reflector 3 is installed within the lamp chamber, and a lamp bulb 5 is inserted in a bulb mounting hole 4 formed in the reflector 3. The lamp bulb 5 is detachably supported on the reflector 3 by resiliently supporting a metal piece 5a of the lamp bulb 5 by a set spring 7 using a mounting metal piece 6.

Further, the reflector 3 is supported on the lamp body 1 so that an aiming adjustment can be performed. Though not described in detail, a part of the reflector is supported on the lamp body through a ball joint mechanism, and aiming nuts disposed at two different positions screw-engage with a respective aiming adjustment screw supported on the lamp body. When the aiming adjustment screws are operated to rotate, the reflector 3 inclinably moves with respect to the lamp body 1 so that an optical axis of the lamp bulb 5 and the reflector 3 is adjusted.

A circular bulb insertion hole 8 is formed in a back surface of the lamp body 1 facing the lamp bulb 5, and the lamp bulb 5 is detachably attached to the reflector through the bulb insertion hole 8. A circular back cover 9 is detachably mounted on the bulb insertion hole 8 for covering the hole.

Figure 2:
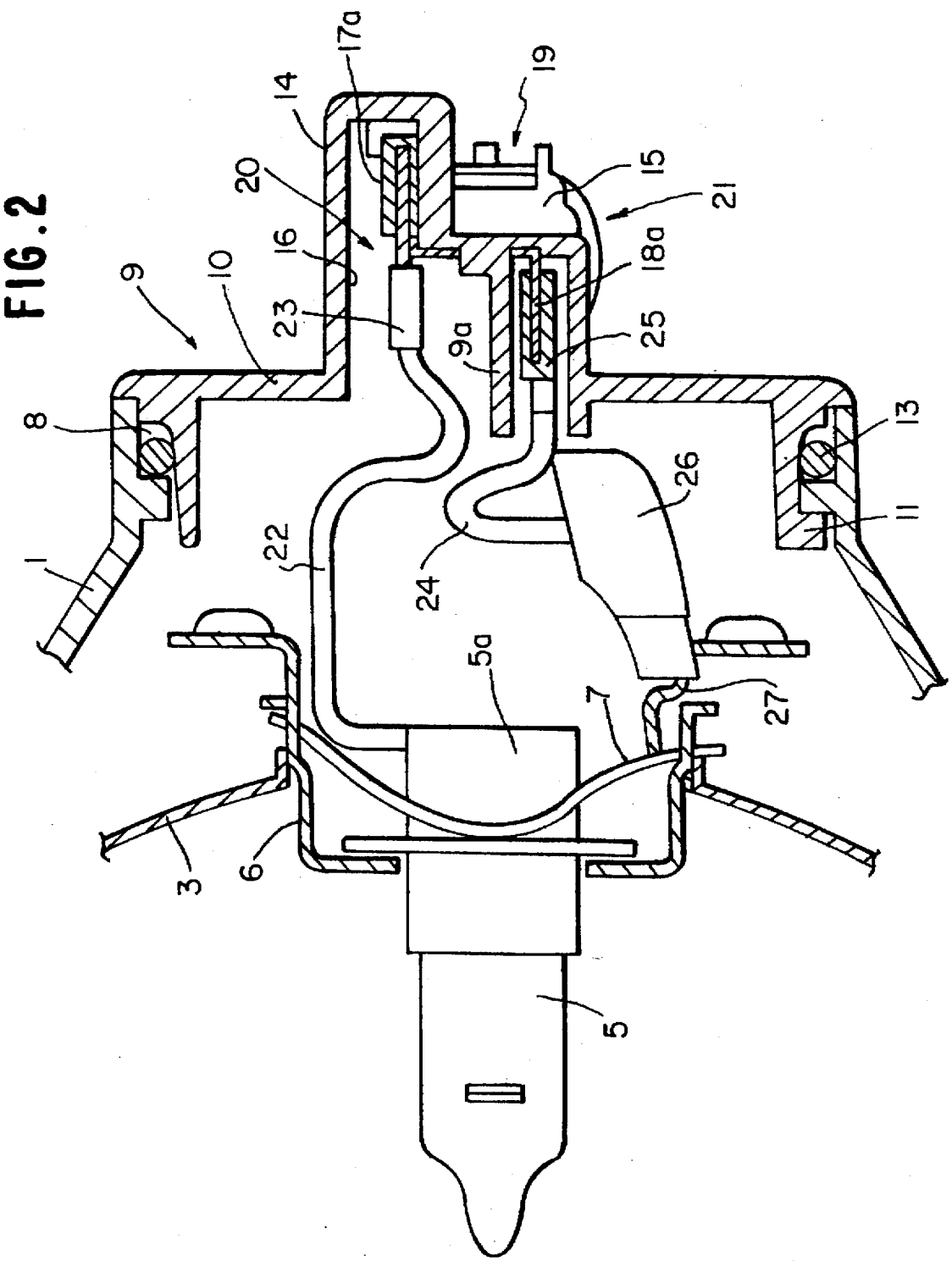
FIG. 2 is an enlarged sectional view showing a back cover shown in FIG. 1.
Figure 4A:
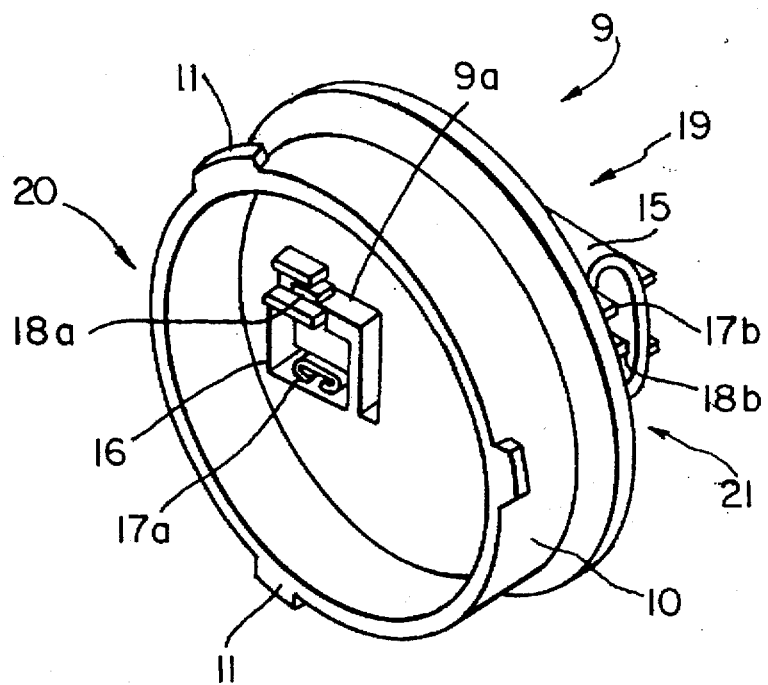
FIGS. 4A and 4B are a perspective and a front views, respectively, showing the back cover shown in FIG. 1.
Figure 4B:
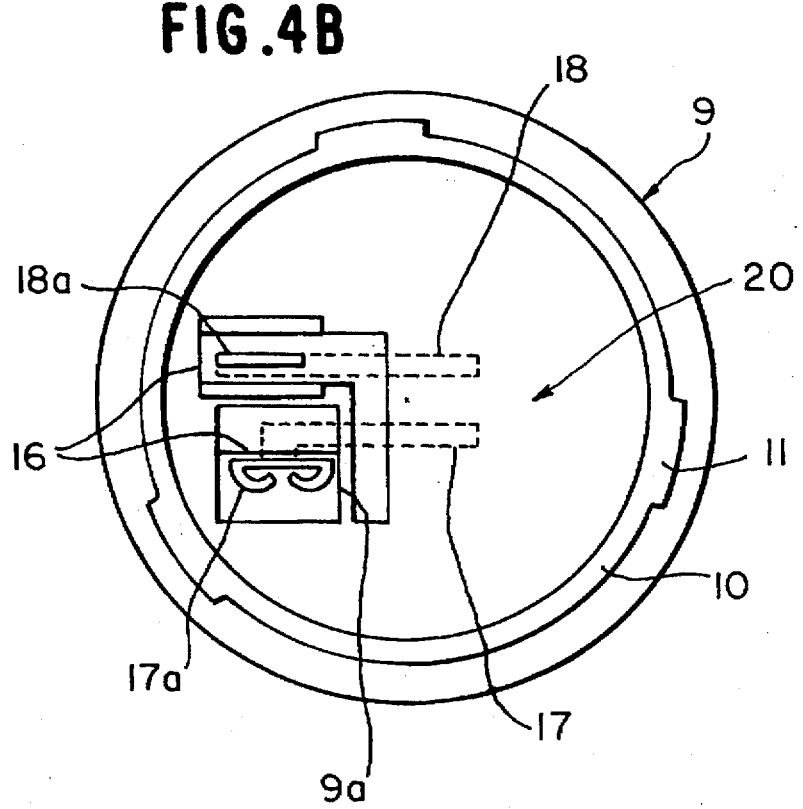

FIG. 2 is an enlarged sectional view showing the back cover 9, FIG. 3 is a perspective view showing an essential part of the back cover, and FIGS. 4A and 4B are a perspective and a front views, respectively, showing the back cover. As shown in these figures, the back cover 9 is provided with a base body 10 formed of resin and having a short cylindrical shape with a bottom, a plurality (three in the present embodiment) of projecting pieces 11 disposed on an opening periphery which engage with notches 12 disposed on an inner periphery of the bulb insertion hole 8. When the back cover 9 is rotated for a small angle while the projecting pieces 11 engage with the notches 12 until the projecting pieces 11 come into abutment against the inner periphery of the bulb insertion hole 8, the back cover 9 is attached to the bulb insertion hole 8 by means of a bayonet mechanism.

A packing 13 is fitted between the back cover 9 and the inner periphery of the bulb insertion hole 8 so that water proof is realized.

The back cover 9 is also provided with a box member 14 disposed on an outer surface of the bottom of the base body 10 extending radially thereof and a cylinder member 15 having a small diameter continuously forming with the box member 14. The insides of the box member 14 and the cylinder member 15 define a recessed part 16, which is rectangular in cross section, formed in the bottom of the back cover 9. A pair of conductive terminals 17, 18 formed of a metal material extend from an internal electrical connection section 20 formed in the recessed part 16 to the box member 14 and the cylinder member 15 of the back cover 9.

The conductive terminals 17, 18, the cylinder member 15 and the recessed part 16 of the back cover 9 constitute a relay connector 19. That is, as shown in FIGS. 4A and 4B, the recessed part 16 is divided into a couple of large and small regions by a partition wall 9a formed integrally with the back cover 9, and one end parts 17a, 18a of each of the conductive terminals 17, 18, which are integrally resin-molded with the back cover 9, are designed to be exposed in the respective inside part of the recessed part 16. A middle part of each of the conductive terminals 17, 18 is appropriately bent in such a manner that the other end parts 17b, 18b are arranged in parallel to each other to be exposed in the inside of the cylinder member 15 thereby to constitute an external electrical connection section 21.

In the recessed part 16, which is divided into the large and small regions, the conductive terminal 18 exposed to the small region of the recess part 16 serves as a negative (earth) electrode terminal, and the end part 18a is exposed like a tongue piece. On the other hand, the conductive terminal 17 exposed in the large region of the recess part 16 serves as a positive electrode terminal, and the end part 17a of which is bent to be a flat bag.

A tongue like electrode piece 23 disposed at a tip end of a bulb code 22 connecting with the bulb metal piece 5a is mounted to be fitted in the positive electrode terminal 17a. On the other hand, the positive electrode terminal 18a fittedly mounts in an electrode terminal 25 which is shaped like a flat bag, disposed at a tip end of an earth code 24 connecting with and earth terminal 27 integrally formed with a part of the mounting metal piece 6. In the present embodiment, the earth code 24 is also provided at a base end thereof a flat bag like earth electrode terminal 26, which mounts to be fitted to the tongue like earth terminal 27.

As described above, in the cylinder member 15 formed at the outer surface of the back cover 9, the other end parts 17b, 18b of the pair of conductive terminals 17, 18 are arranged in parallel to each other to constitute the external electrical connection section 21 of the relay connector 19. A vehicle side connector 28 connecting with a power supply code 29 detachably engages with the external electrical connection section 21.

In the present embodiment, as shown in FIG. 3, the vehicle side connector 28 is provided with an inserting section 30 which inserts in the cylinder member 15 and an outer cylinder section 31 surrounding the cylinder member 15. A couple of electrodes 30a are disposed to face respective hole formed in the inserting section 30. Therefore, when the vehicle side connector 28 is connected with the cylinder member 15 of the relay connector 19, each of the end parts 17b, 18b of the paired conductive terminals 17, 18 electrically connect with the respective electrode 30a, so that the power supply code 29 electrically connects with each of the conductive terminals 17, 18 and also with an internal electrical connection section 20. Under the condition, the outer cylinder section 31 covers the cylinder member 15 for the water-proof performance.

Figure 14:
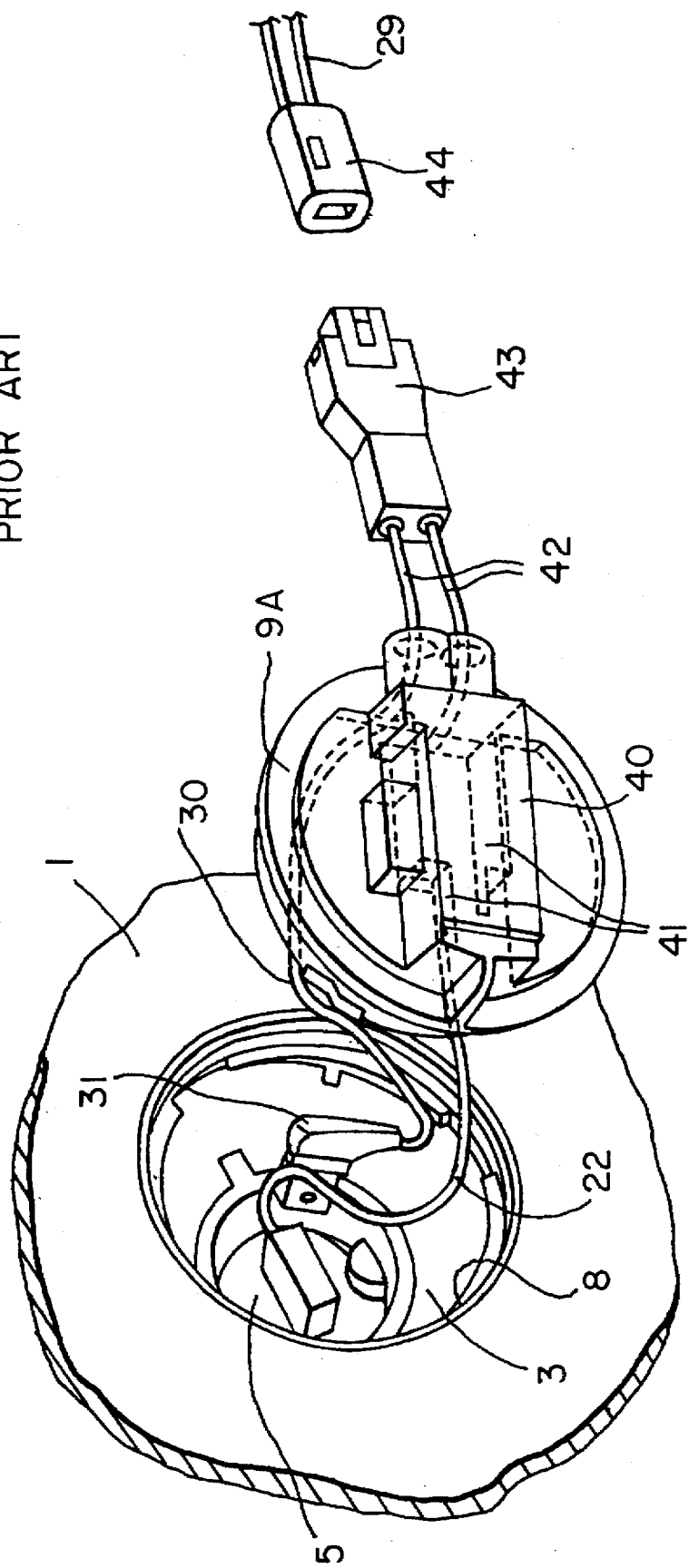
FIG. 14 is a perspective view showing one example of the conventional electrical connection structure.

According to the structure as described above, the relay connector 19 which is integrally formed with the back cover 9 functions both as the intermediate connector 43 and the intermediate code 42 required in the conventional structure shown in FIG. 14. Therefore, the intermediate connector 43 and the intermediate code 42 are not required in the structure of the present invention, which reduces the number of parts. Further, the structure of the invention does not require an operation step for connecting one end of the intermediate code 42 with the relay connector 40 and also an operation step for connecting the other end of the intermediate code 42 with the intermediate connector 43.

Furthermore, during the assembly for the electrical connection of the lamp bulb, the lamp bulb can be connected electrically with the external power source only by connecting the vehicle side connector 28 with the external electrical connection section 21 of the relay connector 19, after the bulb code 22 and the earth code 24 are connected with the internal electrical connection section 20 of the relay connector 19 as also required in the conventional structure. Accordingly, no step is required for connecting the intermediate code 42 with both the relay connector 40 and the intermediate connector 43.

When the lamp bulb 5 is to be exchanged, after detaching the back cover 9 from the lamp body 1, the set spring 7 is released to detach the lamp bulb 5 from the reflector 3, afterwards, the bulb code 22 is disengaged from the conductive terminal 17 of the relay connector 19, and then the a bulb code 22 of a new bulb is engaged with the conductive terminal 17. Therefore, the operation for exchanging the lamp bulb can be accomplished extremely simple. When the lamp bulb is exchanged, it is preferable that the electrical connection with the power source is once shut off. When it takes place, only required is to disengage the vehicle side connector 28 from the cylinder member 15. Thus the operation is very simple.

If an external force is applied to the power supply code 29, the relay connector 19 is never damaged due to the external force applied inside the relay connector 19 because the vehicle side connector 28 is detached from the external electrical connection section 21 of the relay connector 19. It is needless to say that no external force is applied to the lamp bulb 5.

Moreover, since the bulb code 22 and the earth code 24 are formed of a flexible code raw material, when the reflector 3 is pivotally moved with respect to the lamp body 1 for aiming adjustment, the codes do not obstruct the movement of the reflector 3. Further, when the back cover 9 is detached from the lamp body 1 or when the lamp bulb 5 is detached from the reflector 3 thereafter, the bulb code 22 or earth code 24 never obstruct the operation therefor.

The invention is not limited to the afore-described embodiment. Particularly, the other structure of relay connector may be designed if desired.

FIG. 5 is a sectional view showing a fog lamp of an automobile to which a second embodiment of the present invention is applied.

As shown in FIG. 5, a lamp body 101 formed of resin and an outer lens 102 coupled to a front opening of the lamp body 101 define a lamp chamber. A reflector 103 is installed within the lamp chamber, a mounting metal piece 106 is secured to a bulb mounting hole 104 formed in the reflector 103, and a lamp bulb 105 is inserted in a hole formed in the bulb mounting hole 104. The lamp bulb 105 is detachably supported on the reflector 103 by resiliently supporting a metal piece 105a of the lamp bulb 105 by a set spring 107.

As shown in FIG. 6, the mounting metal piece 106, which is formed of a metal material to be like a shallow dish, is secured to the bulb mounting hole 104 formed in the reflector by caulking. The metal piece 105a of the lamp bulb 105 contacts to the opening formed in a bottom surface of the mounting metal piece 106, and a front surface of the metal piece 105a is urged against by bottom surface by a resilient force of the set spring 107 so that the lamp bulb 105 is supported.

The set spring 107, which is formed of a conductive resilient wire material such as metal or the like by bending processing, is pivotally supported at an intermediate part thereof by a bent tongue piece 106a formed at a part of the circumference of the mounting metal piece 106 and, at the same time, the set spring 107 is electrically connected with the mounting metal piece 106. One end part 107a of the set spring 107 hooks on a hook member 106b formed on a part of the circumference of the mounting metal piece 106 opposite the part where the bent tongue piece 106a is formed. While the end part 107a of the set spring 107 hooks on the hook member 106b, the end part 107a resiliently urges the bulb metal piece 105a to thereby support the lamp bulb 5. Further, the other end part 107b of the set spring 107 protrudes toward the rear direction of the mounting metal piece 106. A tip end of the end part 107b which is bent processed and contacts to an earth contact part of the back cover 9 described hereinafter in detail.

As shown in FIG. 5, similar to the first embodiment described above, the reflector 103 is supported on the lamp body 101 so that an aiming adjustment can be performed. Though not described in detail, a part of the reflector is supported on the lamp body through a ball joint mechanism, and aiming nuts disposed at two different positions screw-engage with a respective aiming adjustment screw supported on the lamp body. When the aiming adjustment screws are operated to rotate, the reflector 103 inclinably moves with respect to the lamp body 101 so that an optical axis of the lamp bulb 105 and the reflector 103 is adjusted.

A circular bulb insertion hole 108 is formed in a back surface of the lamp body 101 facing the lamp bulb 105, and the lamp bulb 105 is detachably attached to the reflector through the bulb insertion hole 108. A circular back cover 109 is detachably mounted on the bulb insertion hole 108 for covering the hole.

Figure 7:
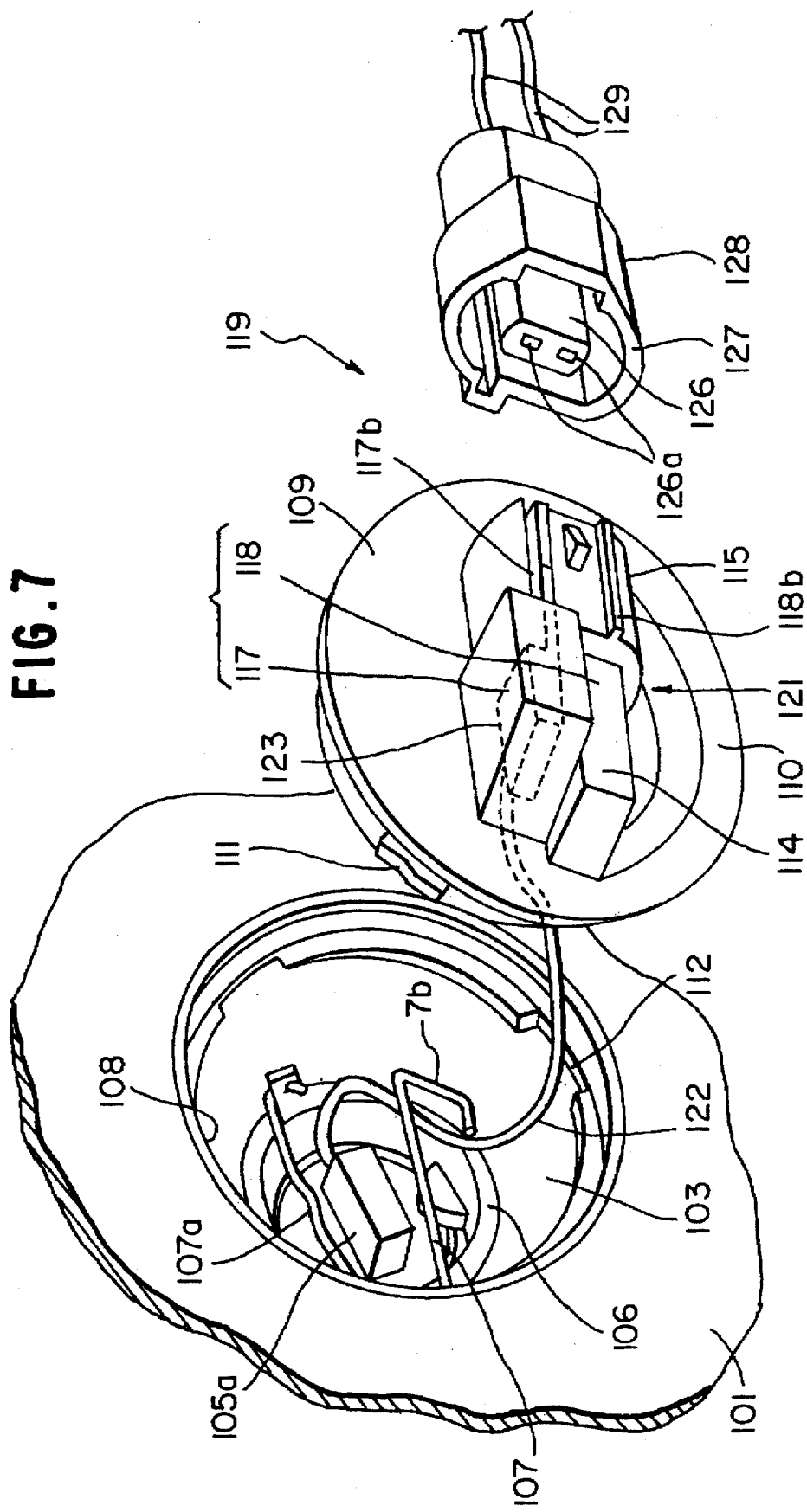
FIG. 7 is a perspective view showing an essential part of a back cover shown in FIG. 5.
Figure 8A:
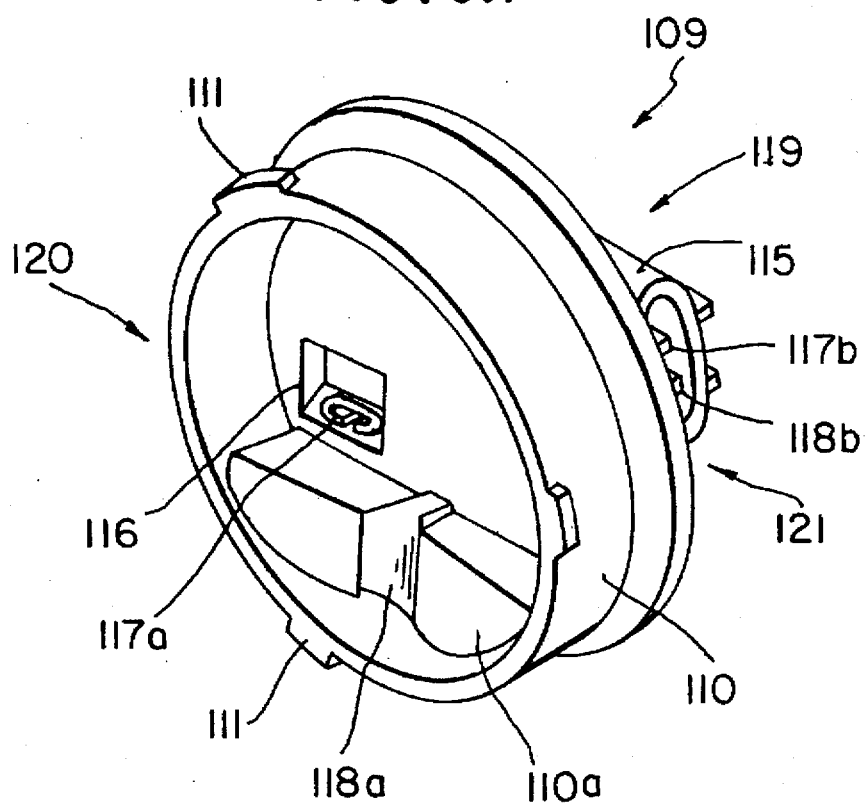
FIGS. 8A and 8B are a perspective and a sectional views, respectively, showing the back cover shown in FIG. 7.
Figure 8B:
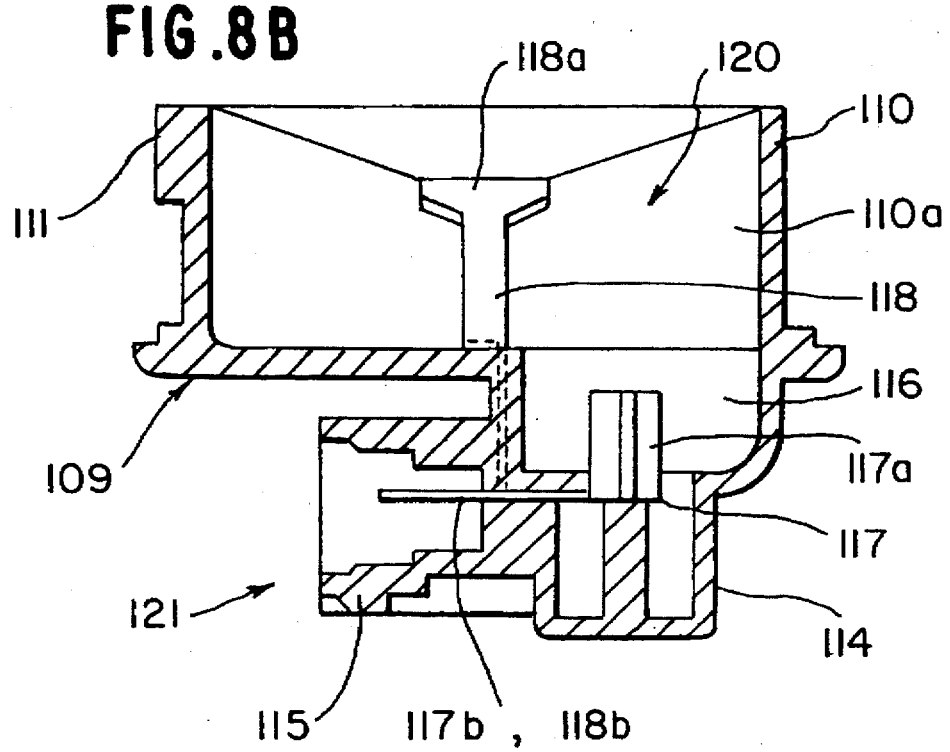
Figure 9:
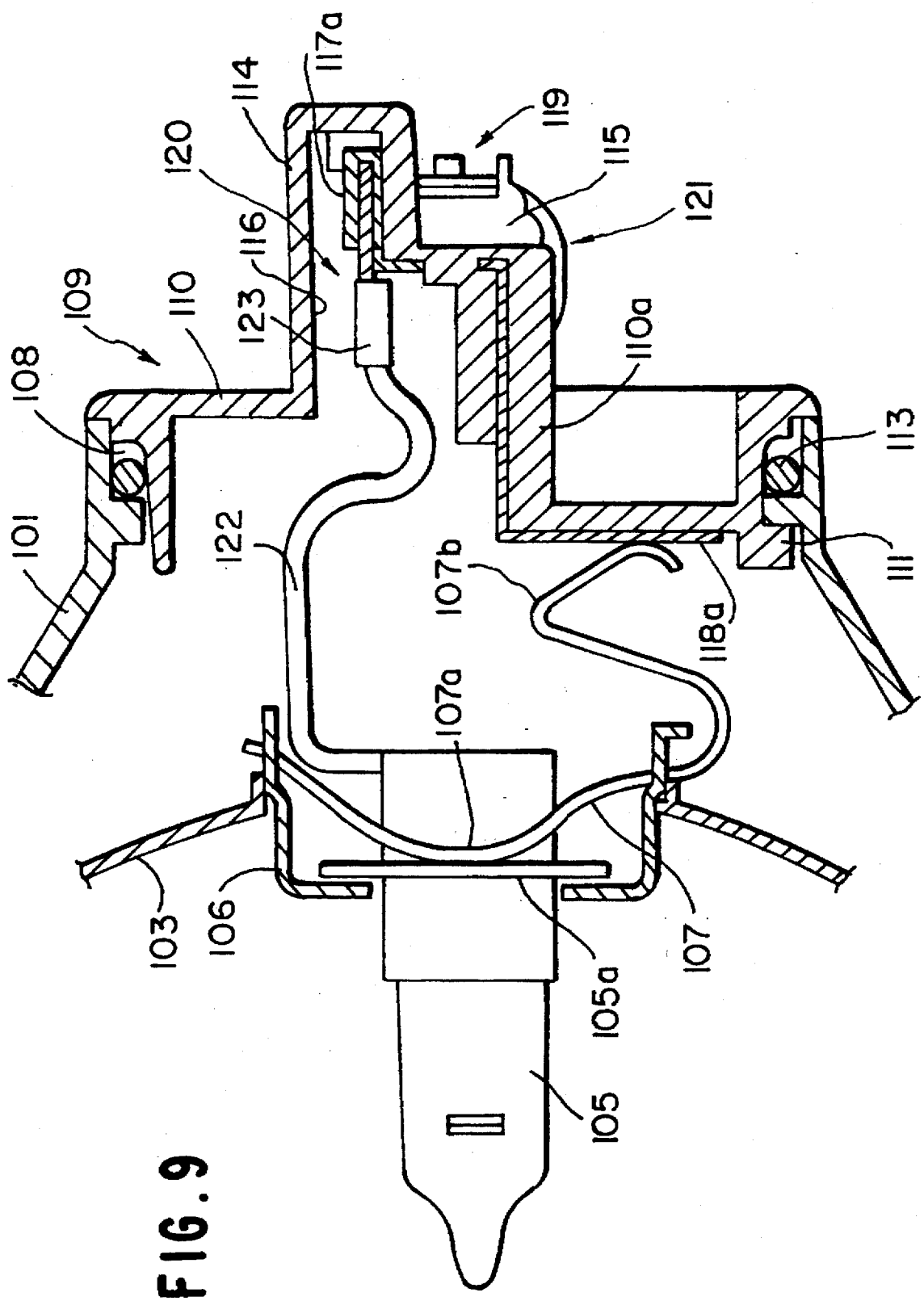
FIG. 9 is an enlarged sectional view showing the back cover shown in FIG. 7.

FIG. 7 is a perspective view showing an essential part of the back cover 9, FIGS. 8A and 8B are a perspective and a sectional views, respectively, showing the back cover, and FIG. 9 is an enlarged sectional view showing the back cover.

As shown in these figures, the back cover 109 is provided with a base body 110 formed of resin is short cylindrical having a bottom, a plurality (three in the present embodiment) of projecting pieces 111 disposed on an opening periphery which engage with notches 112 disposed on an inner periphery of the bulb insertion hole 108. When the back cover 109 is rotated for a small angle while the projecting pieces 111 engage with the notches 112 until the projecting pieces 111 come into abutment against the inner periphery of the bulb insertion hole 108, the back cover 109 is attached to the bulb insertion hole 108 by means of a bayonet mechanism.

A packing 113 is fitted between the back cover 109 and the inner periphery of the bulb insertion hole 108 so that water proof is realized.

The back cover 109 is also provided with a box member 114 disposed on an outer surface of the bottom of the base body 110 extending radially thereof and a cylinder member 115 having a small diameter continuously forming with the box member 114. The insides of the box member 114 and the cylinder member 115 define a recessed part 116, which is rectangular in cross section, formed in the bottom of the back cover 109. A pair of conductive terminals 117, 118 formed of a metal material extend from an internal electrical connection section 120 formed in the recessed part 116 to the box member 114 and the cylinder member 15 of the back cover 109.

The conductive terminals 117, 118, the cylinder member 115 and the recessed part 116 of the back cover 109 constitute a relay connector 119. That is, as best shown in FIGS. 8A and 8B, the internal electrical connection section 20 is provided in which one end part 117a of one of the electrode terminal 117 is housed. Further, at a part of the inside the back cover 109, there is provided a stand member 110a having a certain height. A middle part of the stand member 110a is stepped down the other part thereof while both side parts of the stand member 110a are inclined. An end part 118a of the electrode terminal 118 is exposed and disposed on an area surface of the middle part of the stand member 110a and exposes. A middle part of each of the conductive terminals 117, 118 is appropriately bent in such a manner that the other end parts 117b, 118b are arranged in parallel to each other to expose to inside the cylinder member 115 thereby to constitute an external electrical connection section 121.

One electrode terminal 117 of the internal electrical connection section 120 serves as a positive electrode terminal whereas the other electrode terminal 118 of which serves as a negative electrode terminal connecting with the earth. A tongue like electrode piece 123 disposed at a tip end of a bulb code 122 connecting with the bulb metal piece 105a is mounted to be fitted in the positive electrode terminal 117a. On the other hand, the negative electrode terminal 118 is designed to come into contact to the tip end of the end part 107b of the set spring 107 when the back cover 109 is coupled to the bulb insertion hole 108.

As described above, in the cylinder member 115 formed at the outer surface of the back cover 109, the other end parts 117b, 118b of the pair of conductive terminals 117, 118 are arranged in parallel to each other to constitute the external electrical connection section 121 of the relay connector 119. A vehicle side connector 128 connecting with a power supply code 129 detachably engages with the external electrical connection section 121.

In the present embodiment, as shown in FIG. 7, the vehicle side connector 128 is provided with an inserting section 126 which inserts in the cylinder member 115 and an outer cylinder section 127 surrounding the cylinder member 115. A couple of electrodes 126a are disposed to face respective hole formed in the inserting section 126. Therefore, when the vehicle side connector 128 is connected with the cylinder member 115 of the relay connector 119, each of the end parts 117b, 118b of the paired conductive terminals 117, 118 electrically connect with the respective electrode 126a, so that the power supply code 129 electrically connects with each of the conductive terminals 117, 118 and also with an internal electrical connection section 120. Under the condition, the outer cylinder section 127 covers the cylinder member 115 for the water-proof performance.

According to the structure as described above, the relay connector 119 which is integrally formed with the back cover 109 functions both as the intermediate connector 143 and the intermediate code 142 required in the conventional structure shown in FIG. 14. Therefore, the intermediate connector 143 and the intermediate code 142 are not required in the structure of the present invention, which reduces the number of parts. Further, the structure of the invention does not require an operation step for connecting one end of the intermediate code 142 with the relay connector 140 and also an operation step for connecting the other end of the intermediate code 142 with the intermediate connector 143.

During the assembly for the electrical connection of the lamp bulb, it is required that the bulb code 122 is connected with the internal electrical connection section 120 of the relay connector 119 as the same as the conventional structure. However, according to the present invention, when the back cover 109 is coupled to the bulb insertion hole 108 the end part 107b of the set spring 107 comes into contact resiliently to the end part 118a of the negative electrode terminal 118 at the same time, and the negative electrode terminal 118 of the back cover 109 can connect with the earth terminal of the bulb metal piece 105a through the set spring 107 and the mounting metal piece 106.

Afterwards, the lamp bulb can be connected electrically with the external power source only by connecting the vehicle side connector 128 with the external electrical connection section 121 of the relay connector 119.

When the back cover 109 is coupled, the electrical connection can be accomplished correctly even though the end part of the set spring 107 and the end part 118a of the negative electrode terminal 118 do not face correctly because the end part 107b of the set spring 107 can be guided to the low middle part of the stand member 110a disposed at inner side surface of the back cover 109 owing to the inclined surface of the stand member. Thus, the electrical connection can be accomplished correctly.

When the lamp bulb 105 is exchanged, if the back cover 109 is detached from the lamp body 101 the end part 107b of the set spring 107 disconnects from the negative electrode terminal 118, so that the electrical connection between the negative electrode terminal 118 and the earth terminal of the bulb metal piece 105a is released. Then, the end part 107a of the set spring 107 is disengaged from the hook member 106b, the lamp bulb 105 is detached from the reflector 103, and the bulb code 122 is disengaged from the conductive terminal 117 of the relay connector 119. After a bulb code 22 of a new bulb is engaged with the conductive terminal 117, when the back cover 109 is coupled again, the end part 107b of the set spring 107 comes into contact electrically with the negative electrode terminal 118 so that the electrical connection with the earth is again obtained. Therefore, the operation for exchanging the lamp bulb can be made extremely simple.

When the lamp bulb is exchanged, it is preferable that the electrical connection with the power source is once shut off. When it takes place, only required is to disengage the vehicle side connector 128 from the cylinder member 115. Thus the operation is very simple.

If an external force is applied to the power supply code 129, the relay connector 119 is never damaged due to the external force applied inside the relay connector 119 because the vehicle side connector 128 is detached from the external electrical connection section 121 of the relay connector 119. It is needless to say that no external force is applied to the lamp bulb 105.

Moreover, since the bulb code 122 and the earth code 124 are formed of a flexible code raw material, when the reflector 103 is inclined moved with respect to the lamp body 101 for aiming adjustment, the codes do not obstruct the movement of the reflector 103. Further, since the set spring 107 contacts with the negative electrode terminal 118 of the back cover 109 merely resiliently, the aiming adjustment operation of the reflector 103 is not obstructed by the set spring 107. Furthermore, when the back cover 109 is detached from the lamp body 101 or when the lamp bulb 105 is detached from the reflector 103 thereafter, the bulb code 122 or earth code 124 never obstruct the operation therefor.

Figure 10A:
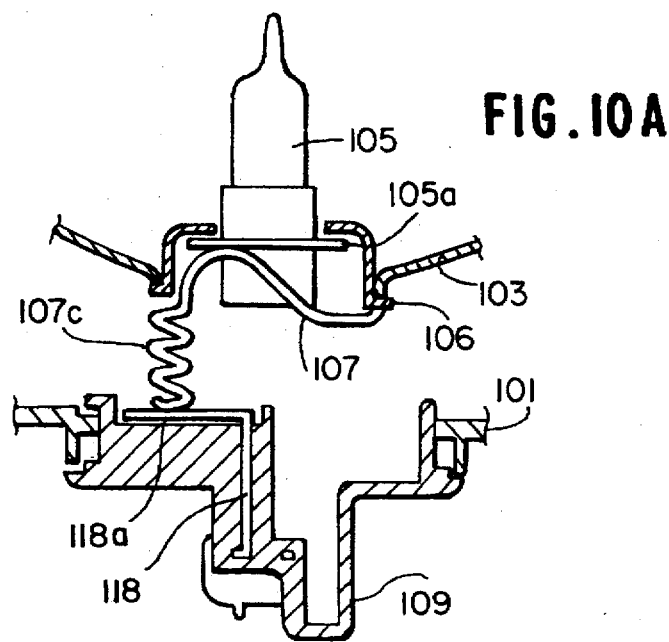
FIGS. 10A, 10B are views showing a modified set spring engaging with a mounting metal piece according to the present invention.
Figure 10B:
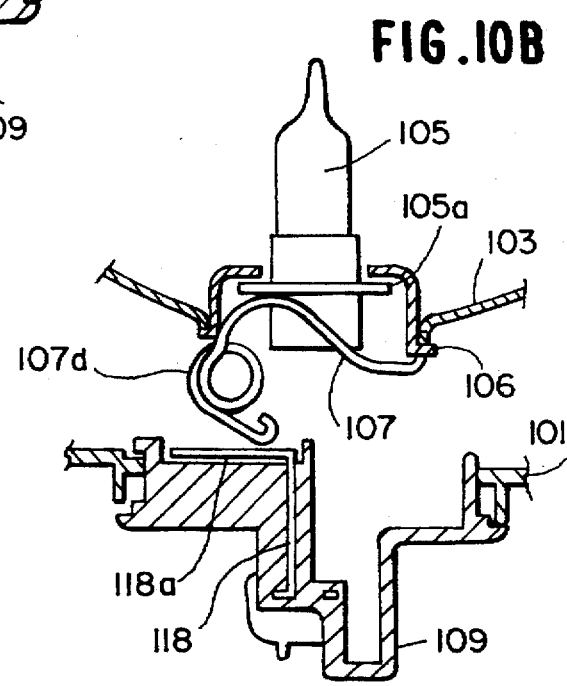

FIGS. 10A, 10B are views showing a modified set spring 107 engaging with a mounting metal piece 106 according to the present invention.

In the modification shown in FIG. 10A, an end part 107c of the set spring 107 is bent to perform as a compression coil. A tip end of the compression coil spring 107c contacts resiliently to the end part 118a of the negative electrode terminal 118 of the back cover 109. In the modification shown in FIG. 10B, on the other hand, an end part 107d of the set spring 107 is bent to perform as a spiral spring. A tip end of the spiral coil spring 107d contacts resiliently to the end part 118a of the negative electrode terminal 118 of the back cover 109.

Figure 11:
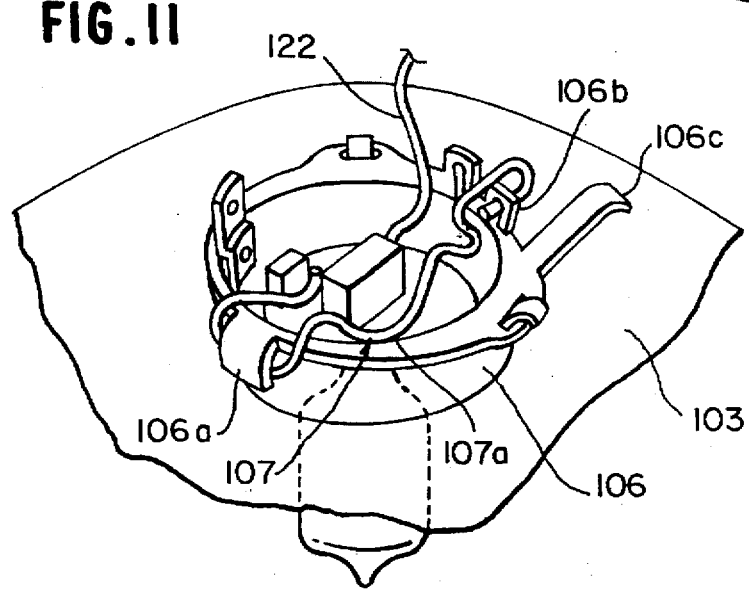
FIG. 11 is a perspective view showing another modification of the electrical contact according to the invention.

In spite of using the set spring for achieving the electrical contact, as shown in FIG. 11, the mounting metal piece 106 having a resilient force is formed integrally with a web piece 106c at a part thereof. A tip end part of the web piece 106c protruding from the mounting metal piece 106 contacts to the end part 118a of the negative electrode terminal 118 of the back cover 109.

Figure 12A:
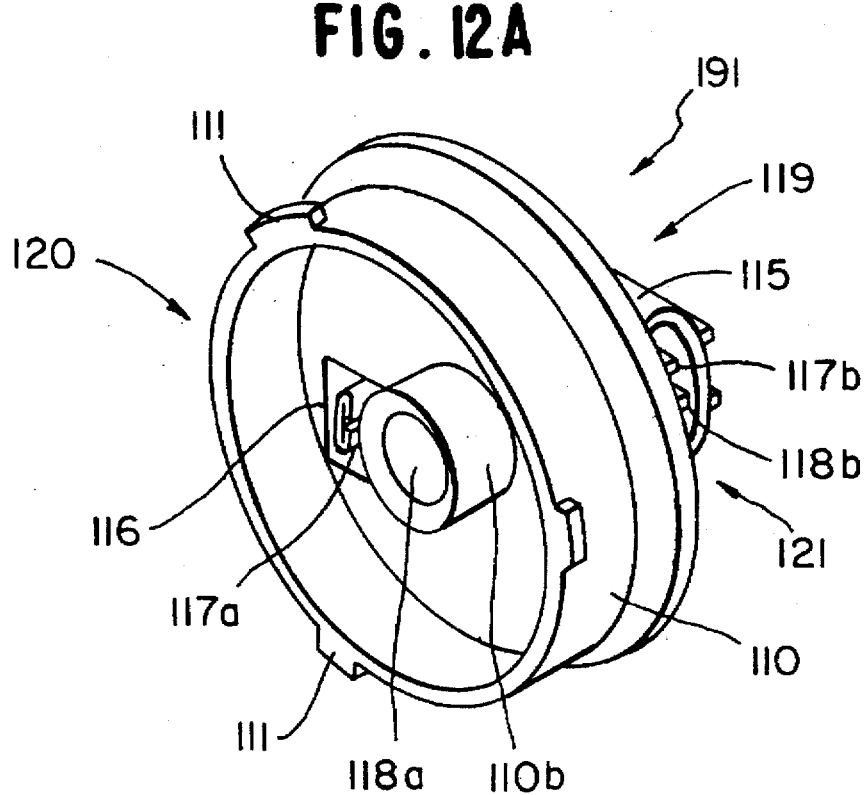
FIGS. 12A and 12B are a perspective view and a sectional view, respectively, showing a modification of the back cover.
Figure 12B:
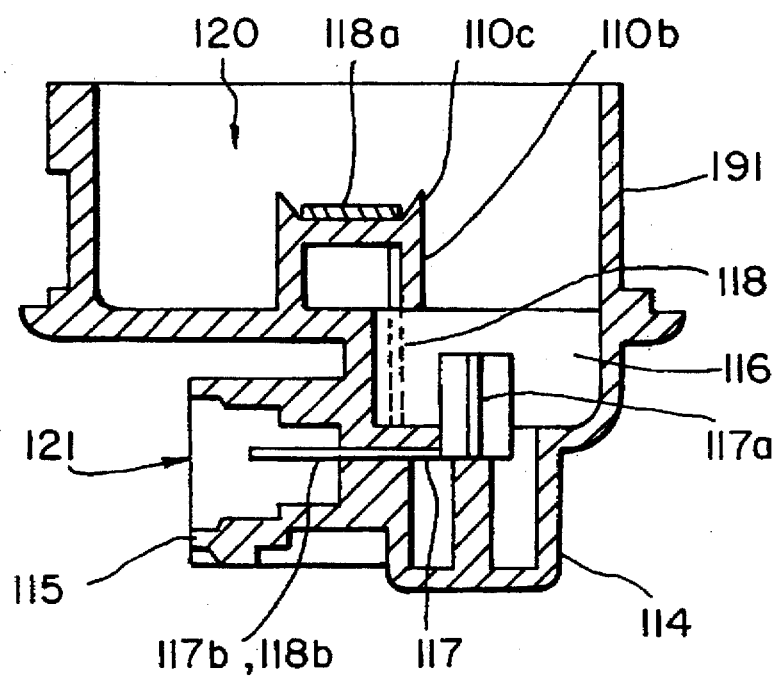

10 FIGS. 12A and 12B are a perspective view and a sectional view, respectively, showing a modification of the back cover. According to the modification, a back cover 191 is provided with a cylindrical stand portion 110b at substantially center of an inner surface thereof. The cylindrical stand portion 110b of the back cover 191 is formed with a tapered peripheral wall 110c at the top thereof, and the end part 118a of the negative electrode terminal 118 is disposed at the top of the cylindrical stand portion. In the modification, when the back cover 191 is coupled, the end part 107b of the set spring 107 is guided by the tapered surface of the peripheral wall 110c to the end part 118a of the negative electrode terminal 118 to achieve the electrical contact.

Figure 13A:
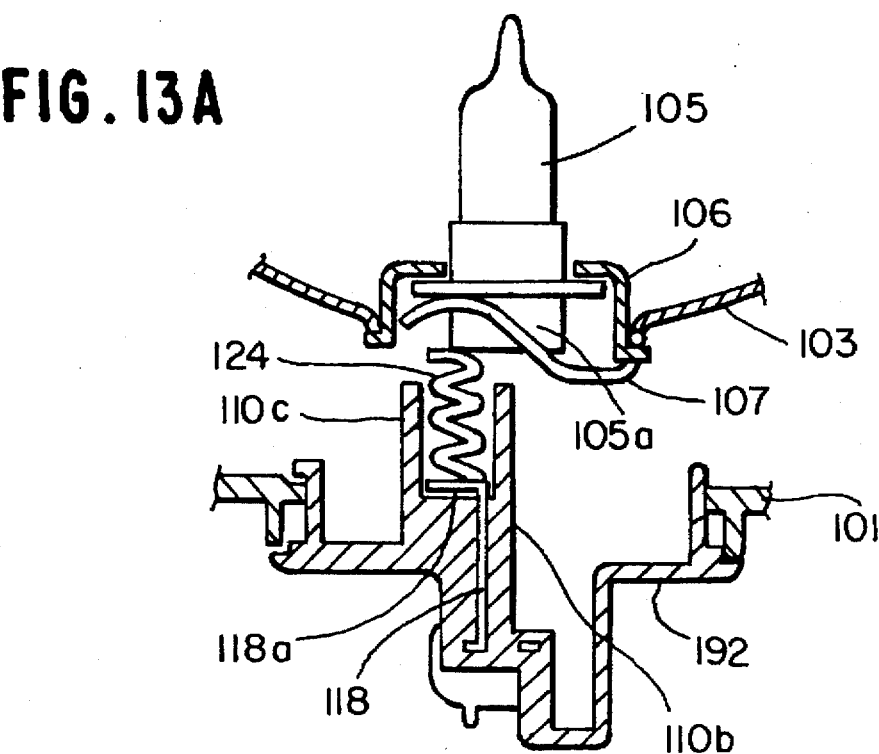
FIGS. 13A and 13B are sectional views showing another modification of the back cover.
Figure 13B:
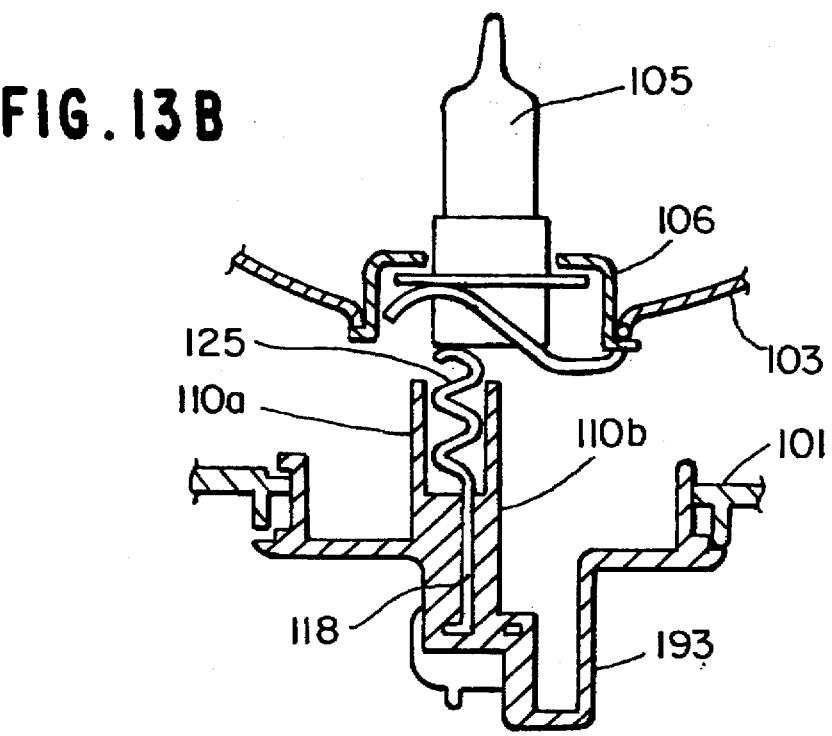

FIGS. 13A and 13B are sectional views showing another modification of the back cover. In this modification, as shown in FIG. 13A, a spring member 124 formed by a conductive material is disposed on a back cover 192 side. The spring member 124 resiliently contacts to the bulb metal piece 105a or the mounting metal piece 106 to obtain the electrical contact. For example, as one example, the height of the peripheral wall 110c of the cylindrical stand portion 110b of the back cover 191 shown in FIG. 12 is made high into which the spring member 124 formed of a metal wire is inserted. When the back cover 192 is coupled, the tip end of the spring member 124 resiliently contacts to the bulb metal piece 105a so that the metal piece 105a and the end part 118a of the negative electrode terminal 118 are electrically connected to each other.

Alternatively, according to a back cover 193 as shown in FIG. 13B, the end part 118a of the negative electrode terminal 118 extends up, and the end part is bent several times to constitute a resilient member 125 having a resilient force. A tip end part of the resilient member 125 contacts resiliently to the bulb metal piece 105a or the mounting metal piece 106 so that the electrical contact to the negative electrode terminal 118 can be accomplished.

In any of the modifications as embodied above, at the same time when the back cover is coupled to the lamp body, the negative electrode terminal disposed on the back cover comes into electrically contact with the negative electrode terminal of the lamp bulb. Therefore, the structure of the invention does not require any earth code as the conventional structure required. Therefore, the assembly of the lamp can be simplified.

It is needless to say that the present invention may be also applied to the electrical contact of the positive electrode side.

As described above, according to the present invention, in a vehicular lamp having a structure of electrical connection between a lamp bulb serving as a light source installed in a lamp body and an external power source for supplying electric power to the lamp bulb, including a back cover detachably attached to a bulb insertion hole formed in a back surface of the lamp body and a relay connector connecting with both the lamp bulb and an external power source, the relay connector is constituted by an internal electrical connection section disposed at an inside of the back cover for electrically connecting with the lamp bulb and an external electrical connection section disposed at an outside of the back cover for connecting with a harness for the external power source, and the internal electrical connection section and the external electrical connection section are formed integrally with each other by a conductive terminal which penetrates the back cover. Therefore, since both the bulb code and the earth code are connected with the internal electrical connection section of the relay connector and the external power source harness is connected with the external electrical connection section to thereby accomplish the electrical connection between the external power source and the lamp bulb, no intermediate connector is required which reduces the number of parts and the workability during the assembling operation can be simplified. Further, if an external force is applied, merely the connector connecting to the external electrical connection section would be detached and no damage would be applied to the relay connector.

Further, since the bulb code and the earth code are formed of a flexible code raw material, when the reflector is inclined moved with respect to the lamp body for aiming adjustment, the codes do not obstruct the movement of the reflector and, further, when the back cover is detached from the lamp body or when the lamp bulb is detached from the reflector thereafter, the bulb code or earth code never obstruct the operation therefor.

Furthermore, since the electrode of the lamp bulb and the electrode terminals formed on the back cover are electrically contact to each other by a resilient force of a resilient member, when the lamp bulb is to be exchanged, merely attaching and detaching the back cover to or from the lamp body the electrical contact can be accomplished automatically. Therefore, the operation for exchanging the lamp bulb can be made extremely simple without requiring an operation step for connecting the earth code.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. An electrical connection structure for a vehicular lamp, comprising:
    a back cover coupled to a bulb insertion hole formed in a back surface of a lamp body; and
    a relay connector disposed on said back cover, said relay connector comprising an internal electrical connection section electrically connecting with a lamp bulb and an external electrical connection section electrically connecting with an external power source, said internal electrical connection section and said external electrical connection section are formed integrally with each other by a conductive terminal member penetrating said back cover, wherein said relay connector comprises a box member disposed on an outer surface of a bottom of said back cover and a cylinder member having a small diameter continuously formed with said box member.

2. The electrical connection structure according to claim 1, wherein said relay connector is integrally formed with said back cover.

3. The electrical connection structure according to claim 1, wherein an inside of said box member and said cylinder member define a recessed part formed on said back cover, said recessed part is divided into a small region and a large region.

4. The electrical connection structure according to claim 3, wherein said conductive terminal member comprises a positive conductive terminal and a negative conductive terminal both which are integrally resin-molded with said back cover, said negative conductive terminal exposes to said small region of said recessed part and said positive conductive terminal exposes to said large region of said recess part.

5. The electrical connection structure according to claim 4, wherein said external electrical connection section comprises end parts of said positive and said negative conductive terminals arranged in parallel to each other and exposed to an inside of said cylinder member.

6. The electrical connection structure according to claim 5, wherein said end part of said positive conductive terminal exposed to said large region of said recess part is bent.

7. The vehicular lamp according to claim 3, wherein a tip end of said set spring is bent to have a resilient force, said tip end engages with said negative conductive terminal.

8. The vehicular lamp according to claim 3, wherein said tip end of said set spring is bent to perform as a compression coil.

9. The vehicular lamp according to claim 3, wherein said tip end of said set spring is bent to perform as a spiral spring.

10. A vehicular lamp comprising:
    a lamp body formed of a resin material;
    an outer lens coupled to a front opening of said lamp body;
    a lamp chamber defined by said lamp body and said outer lens;
    a reflector installed within said lamp chamber, said reflector forming therein a bulb mounting hole;
    a lamp bulb having a metal piece inserted in said bulb mounting hole;
    a set spring resiliently urging said metal piece of said lamp bulb against said reflector;
    a back cover coupled to a bulb insertion hole formed in a back surface of said lamp body; and
    a relay connector disposed on said back cover, said relay connector comprising an internal electrical connection section electrically connecting with a lamp bulb and an external electrical connection section electrically connecting with an external power source, said internal electrical connection section and said external electrical connection section are formed integrally with each other by a conductive terminal member penetrating said back cover.

11. The vehicular lamp according to claim 10, wherein said relay connector is integrally formed with said back cover.

12. The vehicular lamp according to claim 10, wherein said relay connector comprises a box member disposed on an outer surface of a bottom of said back cover and a cylinder member having a small diameter continuously forming with said box member.

13. The vehicular lamp according to claim 12, wherein an inside of said box member and said cylinder member define a recessed part formed on said back cover, said recessed part is divided into a small region and a large region.

14. The vehicular lamp according to claim 13, wherein said conductive terminal member comprises a positive conductive terminal and a negative conductive terminal both which are integrally resin-molded with said back cover, said negative conductive terminal exposes to said small region of said recess part and said positive conductive terminal exposes to said large region of said recess part.

15. The vehicular lamp according to claim 14, wherein said external electrical connection section comprises an end parts of said positive and said negative conductive terminals arranged in parallel to each other and exposing to inside said cylinder member.

16. The vehicular lamp according to claim 15, wherein said end part of said positive conductive terminal exposing to said large region of said recess part is bent to be a flat bag.

17. The vehicular lamp according to claim 10, wherein said conductive terminal member comprises a positive conductive terminal and a negative conductive terminal both which are integrally resin-molded with said back cover.

18. The vehicular lamp according to claim 17, wherein said set spring is a part of said negative electrode terminal extending up and spirally bent.

19. The vehicular lamp according to claim 17, wherein said back cover comprises a cylindrical stand portion at substantially center of an inner surface thereof, said cylindrical stand portion of said back cover comprises a tapered peripheral wall at a top thereof, and an end part of said negative electrode terminal is disposed at the top of said cylindrical stand portion.

20. The vehicular lamp according to claim 17, wherein said back cover comprises a stand member having a predetermined height disposed insider said back cover, a middle part of said stand member being recessed and other end parts of said stand member being inclined.

21. An electrical connection structure for a vehicular lamp, comprising:

a back cover coupled to a bulb insertion hole formed in a back surface of a lamp body;

a relay connector disposed on said back cover, said relay connector comprising an internal electrical connection section electrically connecting with a lamp bulb and an external electrical connection section electrically connecting with an external power source, said internal electrical connection section and said external electrical connection section are formed integrally with each other by a conductive terminal member penetrating said back cover, said conductive terminal member including a positive conductive terminal and a negative conductive terminal both of which are integrally resin-molded with said back cover; and a spring electrically engaged with said negative conductive terminal and a metal piece of said lamp bulb.

22. The electrical connection structure according to claim 21, wherein said spring is an end of a set spring urging said lamp bulb against the reflector.

23. The electrical connection structure according to claim 22, wherein a tip end of said set spring is bent to have a resilient force, said tip end engages with said negative conductive terminal.

24. The electrical connection structure according to claim 22, wherein said tip end of said set spring is bent to perform as a compression coil.

25. The electrical connection structure according to claim 22, wherein said tip end of said set spring is bent in a spiral.

26. The electrical connection structure according to claim 21, wherein said spring is a part of said negative electrode terminal extending up and spirally bent.

27. The electrical connection structure according to claim 21, wherein said back cover comprises a cylindrical stand portion at substantially center of an inner surface thereof, said cylindrical stand portion of said back cover comprises a tapered peripheral wall at a top thereof, and an end part of said negative electrode terminal is disposed at the top of said cylindrical stand portion.

28. The electrical connection structure according to claim 21, wherein said back cover comprises a stand member having a predetermined height disposed inside said back cover, a middle part of said stand member being recessed and other end parts of said stand member being inclined.

* * * * *